United States Patent
Büchner et al.

(10) Patent No.: US 6,545,067 B1
(45) Date of Patent: Apr. 8, 2003

(54) ADDITIVES FOR MINERAL BUILDING MATERIALS CONTAINING CEMENT

(75) Inventors: Karl-Heinz Büchner, Altlussheim (DE); Michael Ehle, Ludwigshafen (DE); Johannes Perner, Neustadt (DE); Knut Oppenländer, Ludwigshafen (DE); Markus Hartmann, Neustadt (DE); Wolfgang Günther, Mettenheim (DE); Matthias Kroner, Eisenberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/805,773

(22) PCT Filed: Sep. 10, 1999

(86) PCT No.: PCT/EP99/06687

§ 371 (c)(1),
(2), (4) Date: Mar. 16, 2001

(87) PCT Pub. No.: WO00/17128

PCT Pub. Date: Mar. 30, 2000

(30) Foreign Application Priority Data

Sep. 18, 1998 (DE) ......................... 198 42 859

(51) Int. Cl.[7] ................................. C08K 3/00
(52) U.S. Cl. .................... 524/2; 524/4; 524/5; 524/599
(58) Field of Search ............... 524/599, 2, 4, 524/5

(56) References Cited

U.S. PATENT DOCUMENTS

| 4,586,960 A | 5/1986 | Iizuka et al. |
| 4,906,298 A | 3/1990 | Natsuume et al. |
| 6,127,331 A | * 10/2000 | Cleary ........................ 510/528 |

FOREIGN PATENT DOCUMENTS

| DE | 44 20 444 | 3/1995 |
| DE | 196 53 524 | 6/1998 |
| EP | 0 306 449 | 3/1989 |
| EP | 0 338 293 | 10/1989 |
| FR | 2 706 447 | 12/1994 |
| WO | WO 83/02938 | 9/1983 |

OTHER PUBLICATIONS

Patent Abstracts of Japan, vol. 1996, No. 01, Jan. 31, 1996, JP 07 232945, Sep. 5, 1995.

* cited by examiner

Primary Examiner—Edward J. Cain
(74) Attorney, Agent, or Firm—Oblon, Spivak, McClelland, Maier & Neustadt, P.C.

(57) ABSTRACT

Mixtures of at least one polycarboxylate-based plasticizer for cement-comprising mineral building materials, and butoxylated polyalkylenepolyamines or their salts as air detrainers, and the use of such mixtures as additives for mineral building materials comprising cement, are described.

12 Claims, No Drawings

ADDITIVES FOR MINERAL BUILDING MATERIALS CONTAINING CEMENT

The invention relates to mixtures of at least one air detrainer and at least one polycarboxylate-based plasticizer for mineral building materials which comprise cement, and to the use of aqueous solutions of such mixtures as additives for mineral building materials comprising cement.

WO-A-83/02938 discloses hydraulic cement mixtures which comprise ethoxylated or propoxylated polyamines or polyethylenimines for strength enhancement. DE-A-44 20 444 discloses additives for cement-comprising compositions. They include at least one cement plasticizer and at least one antifoam. Examples of appropriate plasticizers are aqueous solutions of copolymers containing, in copolymerized form, monoethylenically unsaturated carboxylic acids and polyalkylene glycol esters of acrylic or methacrylic acid. The plasticizers are used in combination with an antifoam which is either dissolved in the polymer solution or dispersed therein in particles having a diameter of not more than 20 μm. Examples of the antifoams are adducts of ethylene oxide and/or propylene oxide with alcohols or phenols. Insofar as such mixtures are not clear aqueous solutions, additives of this kind lack sufficient stability on storage and separate into two phases.

DE-A-19653524 discloses copolymers of ethylenically unsaturated carboxylic acids and polyalkylene glycol esters of acrylic or methacrylic acid that are obtainable by polymerizing the monomers in the presence of compounds comprising phosphorus in bonded form. Such copolymers are highly effective plasticizers for cement mixtures such as concrete or mortar. They are used in amounts of, for example, from 0.01 to 10% by weight, preferably from 0.05 to 3% by weight, based on the weight of the cement. Advantageously, the plasticizers are used in conjunction with antifoams in order to reduce the level of air pores. Examples of air detrainers suitable for achieving reduction in air pores are products based on polyalkylene oxides, such as adducts of ethylene oxide or propylene oxide with alcohols or phenols; phosphates such as tributyl phosphate or triisobutyl phosphate, phthalates such as dibutyl phthalate, siloxanes such as polydimethylsiloxane, or phosphates of ethoxylated fatty alcohols, such as ethylene oxide stearyl phosphate. Air detrainers of this kind are customarily employed in amounts from 0.05 to 10% by weight, preferably from 0.5 to 5% by weight, based on the polymers that are used as plasticizers.

Further plasticizers used for mineral building materials are homopolymers and copolymers of ethylenically unsaturated carboxylic acids and dicarboxylic acids with styrene (EP-A-0 306 449) or isobutene or diisobutene (EP-A-0 338 293, U.S. Pat. No. 4,586,960 and U.S. Pat. No. 4,906,298). When polycarboxylate-based plasticizers are incorporated into mineral building materials considerable amounts of air are introduced. As a result of the air pores, voids are formed in the concrete, leading to a significant deterioration in the mechanical properties and stability of the concrete. To reduce the level of air pores in the concrete when using plasticizers, it is usual to employ the plasticizers together with air detrainers. Mixtures of polycarboxylate-based plasticizers with air detrainers of the type described above, however, are not sufficiently stable on storage.

It is an object of the present invention to provide storage-stable mixtures of at least one air detrainer and a polycarboxylate-based plasticizer for mineral building materials comprising cement.

We have found that this object is achieved, in accordance with the invention, by mixtures of at least one air detrainer and at least one polycarboxylate-based plasticizer for mineral building materials comprising cement if said mixtures comprise butoxylated polyalkylenepolyamines or their salts as air detrainers. Particular preference is given to mixtures comprising water-soluble butoxylated polyethylenimines as air detrainers.

By mineral building materials are meant preparations comprising as essential constituents mineral binders such as lime and/or, in particular, cement and also—as aggregates—sands, gravels, crushed rocks or other fillers, such as natural or synthetic fibers. The mineral building materials are generally converted, by commixing the mineral binders such as cement and the aggregates together with water, into a ready-to-use formulation which hardens both in air and under water to a stonelike material. So that the cement-comprising mineral building materials have favorable service properties—i.e., are pumpable—while keeping the ratio of water to cement as low as possible, use is made, for example, of polycarboxylates, which are described in the above references. Examples of suitable polycarboxylates are homopolymers and copolymers of acrylic or methacrylic acid, copolymers of styrene and maleic anhydride, copolymers of isobutene and maleic anhydride, and copolymers of diisobutene and maleic anhydride. Particularly preferred plasticizers for cement-comprising mineral building materials are, for example, polyalkylene glycol-acrylic and/or methacrylic acid copolymers esterified with one mole of acrylic or methacrylic acid. Such copolymers are disclosed, for instance, in the cited prior art documents DE-A 4420444 and DE-A 19653524.

Since the use of polycarboxylates alone as plasticizers for cement-comprising mineral building materials is accompanied by a relatively sharp increase in the air pore content of said materials, the invention involves using the customary plasticizers in conjunction with butoxylated polyalkylenepolyamines or their salts in order to reduce the air pore content of mineral building materials. Examples of the polyalkylenepolyamines to be butoxylated are diethylenetriamine, triethylenetetramine, tetraethylenepentamine, pentaethylenehexamine, 3-(2-aminoethyl)aminopropylamine, 2-(diethylamino)ethylamine, 3-(dimethylamino)propylamine, dimethyldipropylenetriamine, 4-aminoethyl-1,8-octanediamine, 3-(diethylamino)propylamine, N,N-diethyl-1,4-pentanediamine, dipropylenetriamine, bis(hexamethylene)triamine, N,N-bis(aminopropyl)methylamine, N,N-bis(aminopropyl)ethylamine, N,N-bis(aminopropyl)hexylamine, N,N-bis(aminopropyl)octylamine, N,N-dimethyldipropylenetriamine, N,N-bis(3-dimethylaminopropyl)amine, N-(aminoethyl)butylenediamine, N-(aminopropyl)butylenediamine, bis(aminopropyl)butylenediamine, and polyethylenimines. The polyethylenimines have molecular masses, for example, of from 200 to 5000, preferably from 400 to 3000. With particular preference, polyethylenimines having molecular masses from 600 to 2000 are used for the butoxylation.

The butoxylated polyalkylenepolyamines contain, for example, from 0.1 to 10 mol of butylene oxide added on per nitrogen group. Preference is given to the use of air detrainers obtainable by butoxylating polyethylenimines having molecular masses from 200 to 5000 with from 0.1 to 10 mol of butylene oxide per mole of ethylenimine units in the polyethylenimine. Air detrainers used with particular preference are the reaction products obtainable by butoxylating polyethylenimines having molecular masses from 400 to 3000 with from 0.3 to 5 mol of butylene oxide per mole of ethenimine units in the polyethylenimine. The best results in terms of air detrainment are obtained with reaction products obtainable by butoxylating polyethylenimines having molecular masses from 600 to 2000 with from 0.8 to 2 mol of butylene oxide per mole of ethylenimine units in the polyethylenimine.

The reaction products of butylene oxide with polyalkylenepolyamines can be used directly in the form as obtained from the butoxylation or else in the form of a salt with, for example, mineral or organic acids such as carboxylic acids or sulfonic acids. The polyalkylenepolyamines can be butoxylated in either one or two stages. In the one-stage procedure, for example, the polyalkylenepolyamines are charged to a reactor together with an alkaline catalyst and the required amount of butylene oxide is injected. The reaction temperature can be, for example, from 25 to 150° C. In the case of multistage addition of butylene oxide the procedure is, for example, in the first stage to charge an aqueous solution of a polyalkylenepolyamine to a pressure vessel fitted with a stirrer and to subject this initial charge at a temperature of 25 to 150° C. to the action of sufficient butylene oxide that primary and secondary amino groups are converted to aminobutanol groups. In the second stage of the butylene oxide addition first the water is removed, an organic solvent is introduced, if desired, and then, in the presence of an alkaline catalyst, butylene oxide is added on to the reaction product obtained in the first stage. Examples of catalysts used are sodium methoxide, potassium tert-butoxide, potassium hydroxide, sodium hydroxide, sodium hydride, potassium hydride, and basic ion exchangers. Subsequent butoxylation of the product obtained in the first stage takes place at from 25 to 150° C. Butoxylation can be effected using 1,2-butylene oxide, 2,3-butylene oxide, or mixtures of said butylene oxides. It is preferred to use 1,2-butylene oxide.

The butoxylated polyalkylenepolyamines may be dissolved in water. Where their solubility in water in their free base form is poor or nonexistent, a mineral or organic acid, such as a carboxylic or sulfonic acid, is added. The resultant salts of butoxylated polyalkylenepolyamines are readily soluble in water. Salt formation may be partial—from 5 to 50% by weight, for example, preferably from 10 to 30% by weight—or else full. It is possible, for example, to prepare aqueous solutions of butoxylated polyalkylenepolyamines whose concentration of butoxylation products is from 10 to 90% by weight, preferably from 50 to 70% by weight. Salts can be formed using, for example, mineral acids such as hydrochloric acid, sulfuric acid or phosphoric acid, or carboxylic acids. Examples of suitable carboxylic acids are formic, acetic and propionic acid. Further suitable organic acids are, for example, toluenesulfonic acid, benzenesulfonic acid, and alkylsulfonic acids such as methanesulfonic acid. To form water-soluble salts of butoxylated polyalkylenepolyamines it is preferred to use acetic acid.

The butoxylated polyalkylenepolyamines can be added in free base or salt form to a mineral building material comprising a polycarboxylate-based plasticizer. For each 100 parts by weight of a polycarboxylate-based plasticizer in the mineral building material use is made of from 0.3 to 30 parts, preferably from 0.3 to 3 parts, by weight of a butoxylated polyalkylenepolyamine or salt thereof in order to reduce the air pore content in the concrete.

In order to establish the desired service properties of the ready-to-use, cement-comprising mineral building materials, preference is given to the use of an aqueous solution of mixtures of a polycarboxylate and water-soluble butoxylated polyalkylenepolyamines. The invention therefore also provides aqueous solutions of mixtures of (a) a water-soluble copolymer containing from 98 to 2% by weight of units of esters of formula (I)

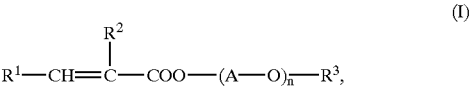

(I)

in which $R^1$ and $R^2$ are identical or different and are H or $CH_3$, A is an alkylene group with 2 to 4 carbon atoms, $R^3$ is H or $C_1$–$C_{22}$-alkyl, and n is from 1 to 300, and from 2 to 98% by weight of units of acrylic acid, methacrylic acid, their alkali metal salts and ammonium salts, and mixtures thereof, and (b) water-soluble butoxylated polyalkylenepolyamines, said mixtures containing from 0.3 to 30 parts by weight of component (b) per 100 parts by weight of component (a) and the concentration of component (a) in the aqueous solution being from 5 to 80% by weight.

Particular preference is given to plasticizers where the water-soluble copolymer contains from 5 to 50 and, in particular, from 15 to 30 alkylene oxide units. Examples of suitable alkylene oxides are ethylene oxide, propylene oxide and butylene oxides, preference being given to the use of ethylene oxide. Alternatively, random polymers or block copolymers of ethylene oxide and propylene oxide or of ethylene oxide, propylene oxide and butylene oxide can be used to prepare the esters of the formula (I). Apart from in the prior art references cited above, copolymers suitable as plasticizers for cement-comprising mineral building materials are described in EP-A 0 753 488, EP-A 734 359, and JP-A-58/74552. Particularly preferred plasticizers are prepared, for example, by free-radical copolymerization of from 60 to 90% by weight of at least one compound of the formula (I) above and from 10 to 40% by weight of acrylic acid, methacrylic acid or mixtures thereof, the sum of the percentages by weight being in each case 100, in aqueous solution. Of particular advantage in this context are copolymers prepared in the presence of from 0.01 to 50% by weight, based on the monomers to be polymerized, of compounds containing phosphorus in bonded form. Examples of suitable compounds of this type are phosphinic acid, hypophosphorous acid, phosphonic acid, phosphorous acid, and the salts of these acids. The molecular mass of the polymers to be used as plasticizers lies, for example, within the range from 10,000 to 500,000.

In order to reduce the air pores in concrete, the above-described mixtures of an air detrainer and a plasticizer based on a water-soluble copolymer preferably comprise water-soluble butoxylated polyethylenimines or their salts. As component (b) of the aqueous mixtures it is preferred to use the reaction products obtainable by butoxylating polyethylenimines having molecular masses from 200 to 5000 with from 0.1 to 10 mol of butylene oxide per mole of ethylenimine units in the polyethylenimine, or salts of said reaction products. Particularly advantageous as component (b) of the aqueous mixtures are reaction products obtainable by butoxylating polyethylenimines having molecular masses from 400 to 3000 with from 0.3 to 5 mol of butylene oxide per mole of ethylenimine units in the polyethylenimine, or salts of said reaction products. For the majority of practical applications, use is made of aqueous mixtures in which the air detrainers used to reduce the air pores in concrete comprise reaction products obtainable by butoxylating polyethylenimines having molecular masses from 600 to 2000 with from 0.8 to 2 mol of butylene oxide per mole of ethylenimine units in the polyethylenimine, or salts of said reaction products. The mixtures described above are used as additives for mineral building materials comprising cement. In this utility, based on cement, for example, from 0.01 to 10% by weight, preferably from 0.05 to 3% by weight, is used of a mixture of the above-described components (a) and (b), with the mixtures of components (a) and (b) preferably being employed in the form of an aqueous solution. The pH of the aqueous solutions of such mixtures is, for example, from 6 to 12, and preferably below 10. Although the above-described mixtures of a polycarboxylate and at least one butoxylated polyalkylenepolyamine or salts thereof are mostly employed in the form of aqueous solutions containing (in dissolved form), for example, from 5 to 80 percent by weight of plasticizer and air detrainer they can also be added in finely divided anhydrous form, for example, as powders or granules, to cement, gypsum or lime as an additive for producing mineral building materials. Particular preference is given to pulverulent mixtures of cement and a combination of plasticizer and air detrainer in which the cement comprises from 0.01 to 10% by weight of the pulverulent combination of plasticizer and air detrainer in extremely uniform distribution.

Unless evident otherwise from the context, the percentages in the examples are in each case by weight, as are the parts.

Determining the Average Molecular Weight

The weight-average molecular weight was determined by gel permeation chromatography (GPC) using aqueous eluents. Calibration was conducted with a Na polyacrylate standard of narrow distribution. The eluent used was an aqueous solution of potassium dihydrogen phosphate and sodium chloride. The internal standard used was polyethylene glycol. The chromatography columns were packed with TSK PW-XL 3000 and TSK PW-XL 5000 (from TosoHaas) as stationary phase. Detection was made with a differential refractometer.

Determining the K Value

The K values of the aqueous sodium salt solutions of the copolymers were determined in accordance with H. Fikentscher, Cellulose-Chemie 13, (1932) 58–64 and 71–74 in aqueous solution at a pH of 7, a temperature of 25° C., and a copolymer sodium salt concentration of 1% by weight.

Determining the Solids Content

A defined amount of the sample (about 0.5–1 g) is weighed into an aluminum boat (initial weight). The sample is dried under an IR lamp (160 volts) for 30 minutes. Then the mass of the sample is measured again (final weight). The percentage solids content SC is calculated as follows:

SC=final weight×100/initial weight [% by wt.]

Performance Tests

Test procedure for concrete plasticizers, on the basis of DIN 1048 Part 1 (Testing the plasticizing action of additives in concrete)

Apparatus:

MultiFlow stirrer type SE/GB (electric motor)

Stirred vessel (h=20.7 cm ; d=40.6 cm)

Slump base (700 mm×700 mm with movable top plate; see DIN 1048 Part 1, 3.2.1.1)

Truncated cone mold (internal diameter top: 130 mm; internal diameter bottom: 200 mm; see DIN 1048 Part 1, 3.2.1.1)

Air pore content measuring instrument (see DIN 1048 Part 1, 3.5.1); sample container (h=8.3 cm ; d=12.3 cm) with screw-on pressure meter Shaker table (electrical)

Stopwatch

Wooden rod (d=1.5 cm ; l=55 cm)

Hand scoop (capacity about 0.6L)

Plastic cube mold (inner edge length L*W*H=15 cm*15 cm*15 cm; open on one side)

Materials:

Mix: Mixing ratio cement/aggregate 1:5.56, grading curve B 16

| | | |
|---|---|---|
| Quartz sand | F34 | 825 g |
| Quartz sand | 0.15–0.6 mm | 1665 g |
| Quartz sand | 0.5–1.25 mm | 2715 g |
| Quartz sand | 1.5–3.0 mm | 1485 g |
| Gravel | 3–8 mm | 3765 g |
| Gravel | 8–16 mm | 3330 g |
| Heidelberger Zement CEM I 32.5R | | 2475 g |
| Tap water | | 1081 g |

Plasticizer as per Table 1 (% of plasticizer, based on solid polymer per amount of cement used; "solids/solids")

Notes:

The amount of water added with the plasticizer must be subtracted from the tap water component. The water/cement ratio is 0.45. The quality of the cement used is checked by sifting.

Test Procedure:

a. Preparing the concrete:

All of the aggregates are weighed into the stirred vessel and mixed dry for 1 minute with the MultiFlow stirrer. Two thirds of the calculated amount of water is then added within a period of 30 seconds, while stirring. Over the next 30 seconds the remaining third of water, admixed with plasticizer, is added to the mixture. The concrete is then stirred for a further 3 minutes. After a total of 5 minutes the preparation of the concrete mixture is at an end. After the concrete has been prepared, the first slump measurement is taken.

b. Slump test:

After the finished concrete composition has been stirred for 5 minutes the first slump measurement is made (see DIN 1048 Part 1, 3.2.1.2 Procedure for testing slump). After the slump has been determined the concrete is returned from the slump base back into the stirred vessel. After a total of 29 minutes 45 seconds the concrete is mixed again for 15 seconds. The second measurement is carried out after exactly 30 minutes. This procedure is repeated after total elapsed times of 60, 90 and 120 minutes or until the measured slump has been reduced to a spread diameter of less than 30 cm.

c. Air pore content:

The air content of fresh concrete is measured by the pressure equilibration method using a calibrated test apparatus having a capacity of 1l. The air pore content is measured after the first and last slump measurement, respectively. Measurement is made by filling the vessel of the air pore content measuring instrument with concrete while the concrete is being compacted for 60 seconds on a shaker table. After shaking, the vessel must be full to the brim with concrete (for procedure see DIN 1048 Part 1, 3.5 Air content). Measurement of the air pore content is then carried out.

d. Testing compressive strength:

Because of the effect of the tested concrete plasticizers on the setting capability of the concrete, a compressive strength test is carried out when required. The compressive strength is determined on test specimens produced in house with an edge length of 15 cm*15 cm*15 cm. At least two cubes are produced from the concrete mixture. The test specimens are produced by half-filling the cubes with concrete, compacting the concrete for 20 seconds on the shaker table, and then adding sufficient concrete to the cube mold that following further compaction for 20 seconds the surface of the concrete is higher than the edge of the actual mold. Finally, the surface of the test specimens is leveled so as to be flush with the height of the cube mold. For the compressive strength test the specimens are stored in a closed room at about 23° C. They should be set down initially in their molds and covered to protect against moisture loss. After about 18 hours the cubes are removed from the molds, and after 24 hours from the time when the concrete mixture was prepared a cube is tested using a press. The force value attained, in kN, is reported in N/mm² and indicates the strength of the concrete after 24 hours. Following storage of the second concrete cube for 28 days from the time of preparation of the concrete, the same test procedure is repeated on the remaining test specimen to determine the compressive strength after 28 days.

Notes:

Before each new series of tests a test without added plasticizer (blank value) must be conducted. Care must also be taken to ensure that the ambient temperature is constant (23–25° C.).

Preparing the Air Detrainers

Air Detrainer 1

A heatable autoclave provided with a stirrer was charged under nitrogen with 43 g of polyethylenimine of average molecular mass $M_w$ 1300 in the form of a 50% strength aqueous solution. The autoclave was closed and the reactor contents were heated with stirring to a temperature of 90° C. As soon as this temperature was reached 72 g of 1,2-butylene oxide were injected and the reaction mixture was stirred to constant pressure. The contents of the autoclave were then cooled to 70° C. The water in the resultant reaction mixture was removed by distillation in a rotary evaporator under reduced pressure. This gave 115 g of a viscous yellowish oil (elemental analysis: 12.3% nitrogen).

Air Detrainer 2

A flask was charged with 43 g of polyethylenimine of average molecular mass $M_w$ 800 and this initial charge was mixed with 2.7 g of 40% strength aqueous potassium hydroxide solution. The mixture was dewatered on a rotary evaporator under a water pump vacuum at a temperature of up to 120° C. The dry product was then charged under nitrogen at 90° C. to a heatable autoclave provided with a stirrer and was then heated to a temperature of 145° C. As soon as this temperature was reached 93.6 g of 1,2-butylene oxide were injected and the reaction mixture was stirred to constant pressure and then cooled to about 80° C. Removal of the water from the reaction mixture on a rotary evaporator left 137 g of a viscous yellowish oil (elemental analysis: 11.2% nitrogen).

Air Detrainer 3

A heatable autoclave provided with a stirrer was charged under nitrogen with 43 g of polyethylenimine of average molecular mass $M_w$ 3600 in the form of a 50% strength aqueous solution and, after the autoclave had been closed, this initial charge was heated to a temperature of 120° C. After this temperature was reached 72 g of 1,2-butylene oxide were injected and the reaction mixture was stirred to constant pressure and then cooled to a temperature of 80° C. This gave 115 g of a highly viscous yellowish oil (elemental analysis: 11.9% nitrogen). This product was admixed with 5.3 g of 40% strength aqueous potassium hydroxide solution and the water was then removed under subatmospheric pressure, with the reaction mixture being heated at a temperature of up to 120° C. The dewatered product was then charged under nitrogen into a stirred autoclave, where it was heated to a temperature of 140° C. Then 24.5 g of 1,2-butylene oxide were injected and the reaction mixture was stirred to constant pressure and then cooled to 80° C. This gave 141 g of a yellow viscous oil (elemental analysis: 9.6% nitrogen).

Plasticizer 1

35% strength aqueous solution of a copolymer of (a) 80% by weight methylpolyethylene glycol methacrylate (prepared by esterifying methylpolyethylene glycol containing 20 ethylene oxide units with methacrylic acid) and (b) 20% by weight methacrylic acid, partially neutralized with sodium hydroxide solution.

The copolymer had an average molecular mass $M_w$ of 25,000. It was prepared by copolymerizing the monomers in the presence of sodium hypophosphite in accordance with DE-A-19 653 524.

EXAMPLE 1

A flask equipped with a stirrer was charged with 35 parts of plasticizer 1 (based on the solids content of the plasticizer) and this initial charge was heated to a temperature of 80° C. At this temperature 0.35 part of air detrainer 1 (based on solids content) was added with continuous stirring and the mixture was stirred until it formed a clear solution. It was then cooled to room temperature and stored for a period of 3 months. After this period, the solution was still clear. Neither clouding nor precipitation was found.

EXAMPLE 2

35 parts of plasticizer 1 (calculated on the basis of the solids content) were charged to a stirrer-equipped flask and the contents of the flask were heated to a temperature of 80° C. As soon as this temperature was reached 0.35 part of an aqueous solution of air detrainer 2 (calculated on the basis of the solids content) was added, said solution having been prepared beforehand by neutralizing air detrainer 2 with dilute acetic acid. The result was a clear solution which was cooled to room temperature and stored at room temperature for 3 months. Following storage this solution was still clear. Neither clouding nor any precipitation was found.

EXAMPLE 3

35 parts of plasticizer 1 (calculated on the basis of the solids content) were charged to a stirrer-equipped flask and the solution was heated to a temperature of 80° C. At this temperature 0.35 part of air detrainer 3 (calculated on the basis of the solids content) was added, and the mixture was stirred at a temperature of 80° C. for about 90 minutes. The result was a clear solution which was cooled to room temperature and stored at this temperature for 3 months. Even after 3-month storage the solution was clear. No clouding nor precipitation was found.

EXAMPLES 4–8

Air detrainers 1 to 3 were tested in a concrete mixture for their action as air pore reducers. The investigations were conducted by the procedure indicated above in accordance with DIN 1048. For Examples 4 to 8 the amount of plasticizer 1 (calculated as 100%) used in each case was 0.24%, based on the amount of cement employed. The ratio of water to cement was 0.45 in all cases. The air detrainers used in the examples, and the air pore content of the concrete mixture, are reported in Table 1.

TABLE 1

| Example | Air detrainer No. | Amount of air detrainer [%], based on plasticizer 1 | Air pore content [% by volume] |
|---|---|---|---|
| 4 | 2 | 0.86 | 4.2 |
| 5 | 2 | 1.40 | 3.2 |
| 6 | 1 | 0.86 | 3.8 |

TABLE 1-continued

| Example | Air detrainer No. | Amount of air detrainer [%], based on plasticizer 1 | Air pore content [% by volume] |
|---|---|---|---|
| 7 | 1 | 1.40 | 3.2 |
| 8 | 3 | 1.40 | 4.2 |

EXAMPLE 9

In this example different amounts of air detrainer 1 were used relative to plasticizer 1, and the air pore content was measured in each case. The amounts employed in each case and the results obtained with them are reported in Table 2. As can be seen from that table an increase in the amount of air detrainer added reduces the air pore content in the concrete. This test was carried out using Heidelberger Zement CEMI 32.5 R.
Grading Curve: B 16 Mixing Ratio: 1:5.56
Cement: 2475 g.

All of the investigations reported in Table 2 were carried out using 0.26% of plasticizer 1 (calculated as 100%), based on the amount of cement used. The water:cement ratio was 0.47 in all cases. The amounts of air detrainer, based on the amount of plasticizer employed, calculated as 100% in each case, the air pore content, and the slump are reported in Table 2.

TABLE 2

| Ex. 9 | Air detrainer 1 [%], based on plasticizer 1 (calculated as 100% in each case) | Air pore content in % by volume | Slump in cm after (minutes) | | | | |
|---|---|---|---|---|---|---|---|
| | | | 1 | 30 | 60 | 90 | 120 |
| a) | 1.40 | 2.0 | 50 | 39 | 33 | 30 | 28 |
| b) | 1.10 | 2.2 | 55 | 42 | 35 | 32 | 30 |
| c) | 0.86 | 3.8 | 58 | 45 | 35 | 33 | 30 |

EXAMPLE 10

Example 9 was repeated with the changes shown in Table 3. In this case, the results reported in Table 3 were obtained. Whereas the mixture of air detrainer 1 and plasticizer 1 gave a clear solution which was stable on storage, the mixture of plasticizer 1 with commercially customary phosphate as air detrainer was cloudy and separated after 48 hours.

Mixtures of plasticizer and antifoam which separate after only a short time are unsuitable for use as a cement additive.

TABLE 3

| | [%] Plasticizer 1, based on cement | [%] Air detrainer, based on plasticizer (calculated as 100% in each case) | Air pore content [% by volume] | Slump (cm) after (minutes) | | | | | Compressive strength [N/mm²] after | |
|---|---|---|---|---|---|---|---|---|---|---|
| | | | | 1 | 30 | 60 | 90 | 120 | 1 day | 28 days |
| Example 10 | 0.26 | 1.0 air detrainer 1 | 3.0 | 58 | 45 | 35 | 33 | 30 | 30 | 56 |
| Comparative Example 2 | 0.26 | 1.0 commercially customary air detrainer (phosphate) | 3.0 | 55 | 42 | 35 | 33 | 30 | 29 | 54 |

We claim:

1. A mixture, comprising:
   at least one polycarboxylate-based plasticizer and, as an air detrainer, butoxylated polyalkylenepolyamines or salts thereof mixed with a mineral building material comprising cement.

2. A mixture as claimed in claim 1, which comprises butoxylated polyethylenimines or their salts as air detrainers.

3. A mixture as claimed in claim 1, which comprises, as air detrainers, the reaction products prepared by butoxylating polyethylenimines having molecular weights ranging from 200 to 5000 with from 0.1 to 10 mol of butylene oxide per mole of ethylenimine units in the polyethylenimine, or salts of these products.

4. A mixture as claimed in claim 1, which comprises, as air detrainers, the reaction products prepared by butoxylating polyethylenimines having molecular weights ranging from 400 to 3000 with from 0.3 to 5 mol of butylene oxide per mole of ethylenimine units in the polyethylenimine, or salts of these products.

5. A mixture as claimed in claim 1, which comprises, as air detrainers, the reaction products prepared by butoxylating polyethylenimines having molecular weights ranging from 600 to 2000 with from 0.8 to 2 mol of butylene oxide per mole of ethylenimine units in the polyethylenimine, or salts of these products.

6. An aqueous solution comprising a mixture of
(a) a water-soluble copolymer containing from 98 to 2% by weight of units of esters of formula (I)

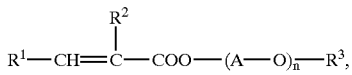

in which $R^1$ and $R^2$ are identical or different and are H or $CH_3$, A is an alkylene group with 2 to 4 carbon atoms, $R^3$ is H or $C_1$–$C_{22}$-alkyl, and n is from 1 to 300, and from 2 to 98% by weight of units of acrylic acid, methacrylic acid, their alkali metal salts and ammonium salts, and mixtures thereof, and (b) butoxylated polyalkylenepolyamines or their water-soluble salts, said mixture containing from 0.3 to 30 parts by weight of component (b) per 100 parts by weight of component (a) and the concentration of component (a) in the aqueous solution being from 5 to 80% by weight.

7. The aqueous solution as claimed in claim 6, which comprises water-soluble butoxylated polyethylenimines or salts thereof as component (b).

8. The aqueous solution as claimed in claim 6, which comprises, as component (b), the reaction products prepared by butoxylating polyethylenimines having molecular weights ranging from 200 to 5000 with from 0.1 to 10 mol of butylene oxide per mole of ethylenimine units in the polyethylenimine, or salts of these products.

9. The aqueous solution as claimed in claim 8, which comprises, as component (b), the reaction products prepared by butoxylating polyethylenimines having molecular weights ranging from 400 to 3000 with from 0.3 to 5 mol of butylene oxide per mole of ethylenimine units in the polyethylenimine, or salts of these products.

10. A mixture as claimed in claim 9, which comprises, as component (b), the reaction products prepared by butoxylating polyethylenimines having molecular weights ranging from 600 to 2000 with from 0.8 to 2 mol of butylene oxide per mole of ethylenimine units in the polyethylenimine, or salts of these products.

11. A mixture as claimed in claim 1, wherein the polyalkylenepolyamine of the butoxylated polyalkylenepolyamine is diethylenetriamine, triethylenetetramine, tetraethylenepentamine, pentaethylenehexamine, 3-(2-aminoethyl)aminopropylamine, 2-(diethylamino)ethylamine, 3-(dimethylamino)propylamine, dimethyldipropylenetriamine, 4-aminoethyl-1,8-octanediamine, 3-(diethylamino)propylamine, N,N-diethyl-1,4-pentanediamine, dipropylenetriamine, bis(hexamethylene)triamine, N,N-bis(aminopropyl)methylamine, N,N-bis(aminopropyl)ethylamine, N,N-bis(aminopropyl)hexylamine, N,N-bis(aminopropyl)octylamine, N,N-dimethyldipropylenetriamine, N,N-bis(3-dimethylaminopropyl)amine, N-(aminoethyl)butylenediamine, N-(aminopropyl)butylenediamine, bis(aminopropyl)butylenediamine and polyethylenimine.

12. A mixture as claimed in claim 1, wherein the polycarboxylates are homopolymers or copolymers of acrylic acid, methacrylic acid, copolymers of styrene and maleic anhydride, copolymers of isobutene and maleic anhydride and copolymers of diisobutene and maleic anhydride.

* * * * *